UNITED STATES PATENT OFFICE.

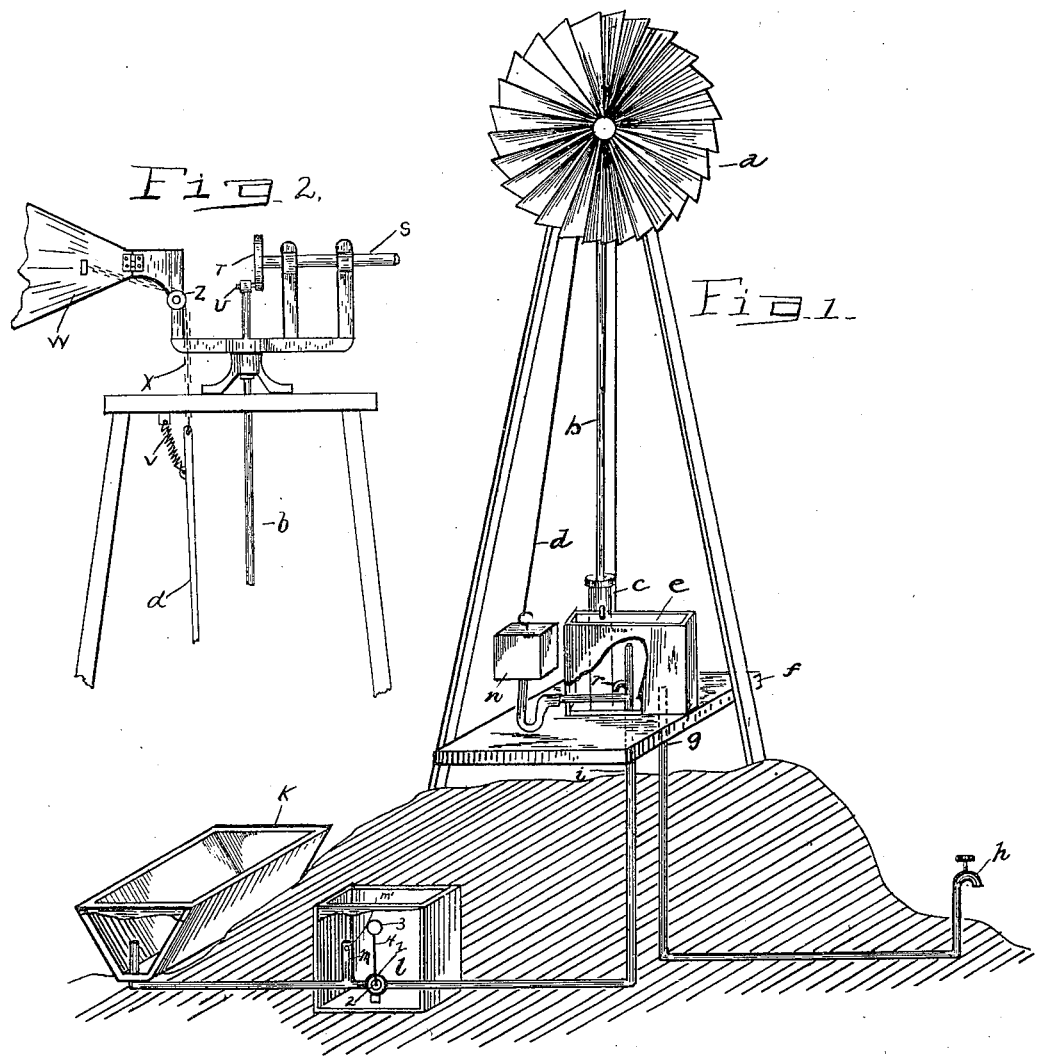

DAVID H. METCALF, OF BATTLE CREEK, MICHIGAN.

WINDMILL-REGULATOR.

SPECIFICATION forming part of Letters Patent No. 663,579, dated December 11, 1900.

Application filed April 19, 1899. Serial No. 713,652. (No model.)

*To all whom it may concern:*

Be it known that I, DAVID H. METCALF, a citizen of the United States, residing at Battle Creek, in the county of Calhoun, State of Michigan, have invented certain new and useful Improvements in Pumping Systems; and I do hereby declare the following to be a full, clear, and exact description of the invention, such as will enable others skilled in the art to which it appertains to make and use the same.

My invention relates to systems of water-distribution, and more particularly to a system in which a windmill or other engine is employed for pumping water into a storage-tank for distribution.

The object of my invention is to provide, in combination with an engine, a storage-tank and pump, a stock-tank, and an auxiliary tank for maintaining the level of water in the stock-tank, and also a regulating-tank for starting and stopping the action of the pump.

Figure 1 is a perspective view of a windmill and tanks equipped in accordance with my invention, and Fig. 2 is a detailed view.

Referring now to the drawings, in operating in accordance with my invention I provide a windmill or other form of engine $a$, adapted to operate a pump $c$ through the medium of a rod $b$, the engine having starting and stopping mechanism, which mechanism is operated by reciprocation of a rod $d$.

In connection with the pump $c$ is arranged a storage-tank $e$, into which the pump is adapted to pour its water from a well beneath the platform $f$, upon which the pump and tank are situated. A common form of house-supply pipe $g$ leads from the bottom of the storage-tank to a spigot $h$, suitably located. A second supply-pipe $i$ leads from the tank $e$ to a stock-tank $k$, on a lower level, said pipe extending upwardly within tank $e$, as shown.

Intermediate the tank $e$ and tank $k$ is an auxiliary tank $l$, through which pipe $i$ passes, said pipe $i$ having a vertical extension $m$ within the tank $l$, projecting upwardly to a point on a level with the height of water desired in tank or trough $k$. This projection is provided with a perforation $m'$ at its upper end between the said extension $m$ and tank $e$, and within the tank $l$ is a float-valve comprising a socket 1, provided with a turning plug 2, to which is secured a rod 4, carrying a float 3. The float-valve is so set that when the level of water within tank $l$ has reached the desired height it will close pipe $i$ against further passage of water. The tank $l$ and its mechanism are in practice below ground, so that they are protected against frost, and tank or trough $k$ will be kept filled in coldest weather. Also by the employment of the auxiliary tank the valve and its mechanism are protected against animals drinking at the trough.

In order to regulate the action of the pump, I have provided a regulating-tank $n$, which is suspended from the rod $d$ of the engine. This tank communicates, by means of a flexible tube, with the pipe $i$ within tank $e$, the size of the tank being such that it will hold a weight of water sufficient to throw the gearing controlled by rod $d$.

The operation of the regulating-tank is as follows: The tank $e$ being empty, the tank $n$ will be in its uppermost position, when the engine will start and water will be pumped into the tank $e$ and through an opening $r$ in a pipe $i$. This pumping action will continue until tank or trough $k$ is filled, when the float-valve will close pipe $i$ and will further continue until water, backing up in pipe $i$, will flow through the flexible tube and into the regulating-tank $n$, which when filled will sink and drawing upon rod $d$ will operate the starting and stopping mechanism of the engine, so as to stop the rod $b$ and shut off the pump $c$. As water is used from the trough or from spigot $h$ the water will sink in tank $e$ and will run from the flexible connection with tank $n$ through an opening $r$, and when the tank $n$ is emptied it and the rod $d$ will be raised by a spring $y$, and the pump will then be allowed to operate to fill tank $e$.

In Fig. 2 I have shown means for throwing the rod $b$ into or out of operation. In this view, $s$ represents the driving-shaft of a windmill, to which is secured a disk $t$, having a projecting pin $u$, which is loosely attached to the rod $b$. Hinged to the support of the shaft $s$ is a vane $w$, to which is fastened a chain $x$, which is passed through a pulley $z$ and secured to the rod $d$, to which is also secured a spring $y$, having connection with the platform and supporting the above-described mechanism.

Having thus described my invention, what I claim is—

1. The combination with a pump and means for operating it, of a storage-tank, a trough having connection with the storage-tank and adapted to receive water therefrom, an auxiliary tank intermediate the trough and storage-tank, a float-valve within the auxiliary tank adapted to regulate the supply of water to the trough, means for throwing the pump-operating means into or out of operative connection with the pump, and a tank connected with said throwing means, said tank having connection with the storage-tank to be supplied thereby and throw the pump-operating means when filled.

2. The combination with a pump and means for operating it, of a storage-tank adapted to receive water from the pump, an auxiliary tank connected with the storage-tank and adapted to receive water therefrom, a float-valve within the auxiliary tank adapted to regulate the supply of water thereto, a trough connected with the auxiliary tank and on a level therewith whereby its supply will be governed from the auxiliary tank, a rod connected with the pump-operating means to throw it into or out of operative relation to the pump, and a tank suspended from said rod, said tank having flexible connection with the storage-tank on a level to receive water therefrom to cause it to sink and draw upon the rod when the storage-tank is full to throw the pump out of operative relation to the operating means.

In testimony whereof I affix my signature in presence of two witnesses.

DAVID H. METCALF.

Witnesses:
M. V. BARKER,
H. J. JOHNSON.